Sept. 24, 1935.  L. H. MIDDLETON  2,015,279
DEFROSTING
Filed Nov. 21, 1932
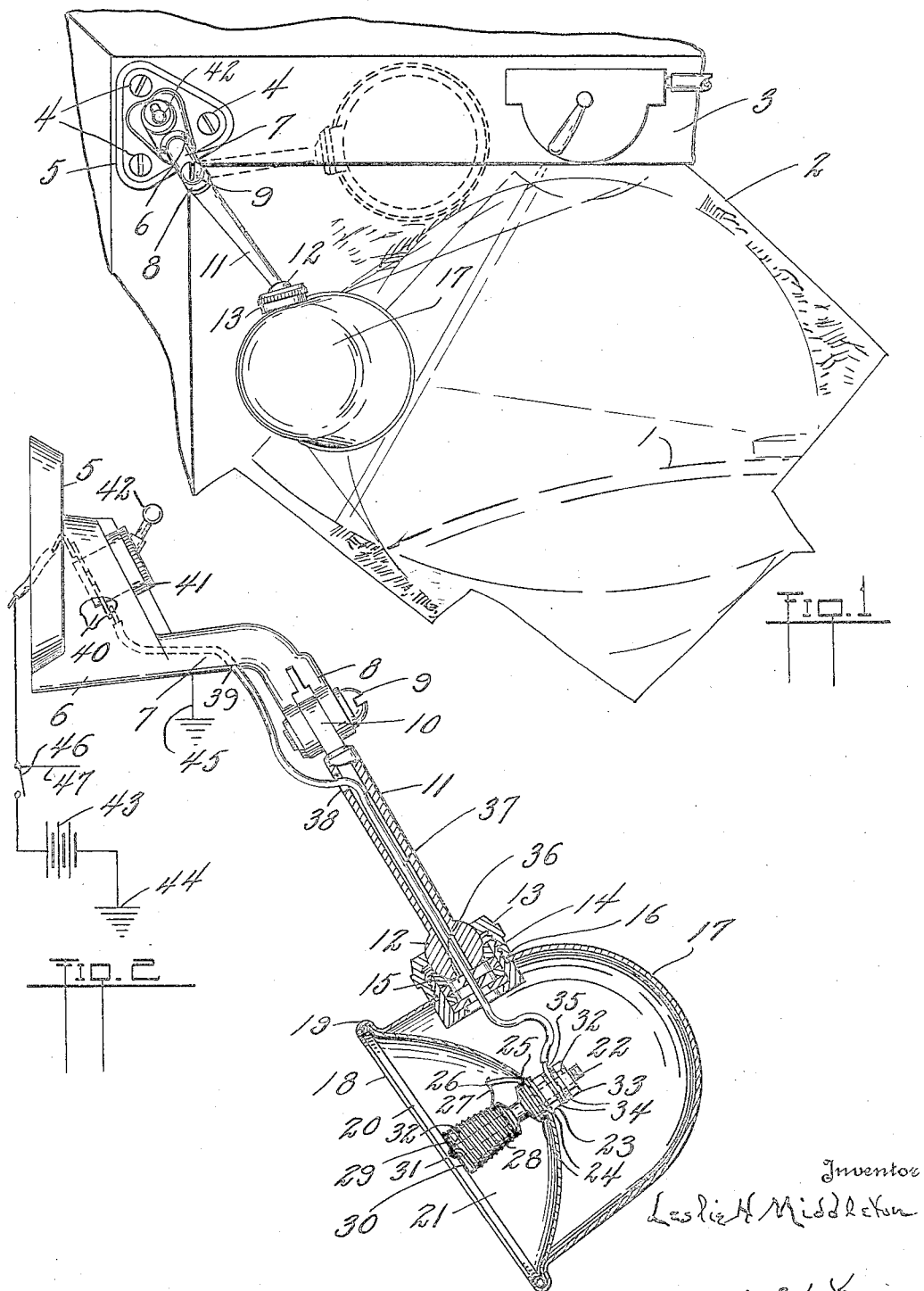
Inventor
Leslie H Middleton
Attorney Patented Sept. 24, 1935

2,015,279

UNITED STATES PATENT OFFICE 2,015,279

DEFROSTING

Leslie H. Middleton, Adrian, Mich., assignor to Schwarze Electric Company, Adrian, Mich., a corporation of Michigan Application November 21, 1932, Serial No. 643,685

1 Claim. (Cl. 219—19)

This invention relates to the generation of infra-red rays approximating the wave length in which the radiant energy generated will be absorbed by aqueous matter, frozen or otherwise, and at the same time transmitted in greater proportion by a glass screen.

This invention has utility when incorporated in windshields or outlook transparencies for elimination of interference, especially from the accumulation of frost, ice, snow and frozen aqueous matter in general, from the windshields of automobiles.

Referring to the drawing:

Fig. 1 is a fragmentary perspective view of an embodiment of the invention installed in a motor vehicle;

Fig. 2 is a detail view on an enlarged scale of the defroster unit of Fig. 1, parts being broken away.

Motor vehicle 1 is shown as having transparency or windshield 2 with frame interior 3 thereabout. Screws 4 through pad 5 of bracket or base 6 mount the unit herein. This base 6 is shown with projecting portion 7 terminating in downwardly and angularly extending offset 8 as a fork with friction pivot 9 therein engaging eye 10 of arm 11 as a link terminating in ball 12, engaged as a frictionally adjusted swivel joint by nut 13 on externally threaded socket 14 having friction elements 15 therein. This socket 14 is a complementary member to the nut 13 and extends through opening 16 in shell 17.

In bringing the nut 13 into frictional gripping relation with the ball or sphere 12, there may be simultaneous gripping of the shell 17 about the opening 16 between these complementary elements 13, 14. This shell 17 has open front 18 bounded by bead 19 in which may be snapped split ring 20 in retaining position for parabolic projector 21. This projector or reflector has centrally thereof stem 22 anchored by nut 23 with the parabolic projector 21 insulated from the stem by insulation washers 24. Between the washers 24 on the concave side of the projector 21 and the projector is ground washer 25 having arm 26 providing terminal 27 connection to helical resistance element 28 wound in grooves 29 on insulator or porcelain 30 mounted on the stem 22.

This resistance 28 has terminal 31 connected with the stem 22 which is insulated in its extension to terminal 32 in the housing 17, where it is assembled by nut 33 to be between washers 34. From this terminal 32 extends conductor 35 through passage 36 in the universal joint at the shell and through conduit 37 through the link or arm 11. This conductor 35 passes out port 38 adjacent the friction pivot joint 8, 9, 10, and then by way of port 39 into chamber 40 of the bracket 6 to switch 41 having external operating arm 42. The conductor 37 extends through the pad 5 of the bracket 6 to battery 43 and then to ground 44. The ground 25 at the reflector 21 is completed from the shell 17, arm 11, and bracket 6 to ground 45. Switch 46 effecting cutting in and out of ignition circuit 47 cooperates herein against the defroster being left on when the gas engine or motor propelling the vehicle is not running.

In locating this unit, desirably at the region in the upper left of the windshield, if the driver be operating a car from the left hand side, this location with the open front 18 may be toward the plane of the windshield 2, and there is determined an angularity, in the instance shown considerably less than 40° from the perpendicular to the windshield 2.

The swinging of the arm 11 on the pivot joint 8, 9, 10, effective for frictionally holding the device in the adjusted position, thus determines an angle for this relation of the projecting rays from the radiator 28 in the projector 21. The swivel joint permits rocking the open front 18 of the projector outward away from the frame 3 of the windshield when the device is swung to inoperative position. Additionally, this universal joint 12, 13, 14, provides a frictional holding so that the housing 17 may be rocked at a desired slight angle relatively to the plane of the windshield 2 to give a spread laterally to a desired extent, preferably with the angularity as to the plane for the axis of the projector 21 within the range of 40° away from the perpendicular. With the maintenance of this range to bring close to this relationship as a maximum, there may be an adequate area of the windshield 2 exposed to an effective degree of ray action and with an efficiency for operation. In the range of 40° from the perpendicular nearly two-thirds of the rays to the windshield have the reflection not in excess of 6% for the energy consumed in the radiator of the unit hereunder.

To illustrate, there is set forth herewith a tabulation of performance:

*Per cent of radiated energy, 100 per cent being the electrical quantity introduced in the generator*

| Glass | Temperature | Volts | Amperes | Transmission | Absorption | Reflection | Total |
|---|---|---|---|---|---|---|---|
| | °F. | | | | | | |
| Plain | 825 | 4 | 3.5 | 9 | 13 | 6 | 28 |
| Do | 1185 | 6 | 5.1 | 23 | 15½ | 6 | 44½ |
| Do | 1720 | 8 | 6.6 | 32 | 16 | 6 | 54 |
| Ply | 825 | 4 | 3.5 | 5 | 18 | 6 | 29 |
| Do | 1185 | 6 | 5.1 | 11 | 28 | 6 | 45 |
| Do | 1720 | 8 | 6.6 | 19 | 28 | 6 | 53 |

It is thus seen that the reflected rays are a constant and a minimum in each instance; that as the temperature increases in the plain windshield, the amount absorbed increased but slightly, and was practically in both windshields the same for 1185° F. and 1720° F.; being around 16 per cent for each on the plain, and 28 per cent each on the ply. However, the rays transmitted jumped in the plain from 9 to 23 per cent in the increase of temperature from 825° F. to 1185° F., and in the ply from 5 to 11 percent. Furthermore, in the further increase from 1185° F. to 1720° F. in the plain, the increase is from 23 to 32 per cent for transmitted rays, and in the ply from 11 to 19 per cent.

It is seen from the foregoing that the reflected rays approximate a constant; that as the temperature is increased, there is increase in the absorption which is minor, and the increase in transmitted rays which is out-of-proportion and greater than the increase in the absorbed rays.

These rays are essentially infra-red rays. In generating infra-red rays in a range from the short wave throughout the band up to the long rays, certain selective bands of wave lengths in the total range have the peculiar power of being absorbed by certain substances dependent first upon the wave length of the infra-red rays generated and second, upon the absorption characteristics of the substance.

In practice, the energy source for the element is say a 6-volt generator or battery in an automobile and the generating element is designed and proportioned to give a mean operating temperature of 1185° F. Wave length is desirable for predominance of infra-red rays.

The problem in low temperature driving of a motor vehicle with ice, snow, sleet or freezing rain, is one wherein clearing of the windshield to insure safe driving vision is important. There is the situation that moisture when congealed has its temperature at the freezing point, 32° F. The interior of the vehicle is normally for the comfort of the driver, very probably considerably warmer than 32° F. or the freezing point. The windshield itself, in the instance of low temperature outside, may be below the freezing point. With the windshield at or below the freezing point, there is no tendency for the frozen material, as adhering thereto, to be released.

Accordingly, in carrying out the invention hereunder, there is such increase in the temperature of the radiator that there is a sufficient increase in the absorption of the energy in the windshield that the windshield temperature may be brought up at least to the melting point to be producing a liquid film at the point of deposit for the moisture. In practice there may be possible action by the energy absorbed to more readily effect this melting. It is important that this temperature of the windshield be not one to warm the windshield to an extent to increase fracture hazard.

Accordingly, as herein disclosed, this range of infra-red ray generation in building up the radiator temperature, is in the region which holds the absorption in the windshield to such minimum so that it will at least be as warm as the freezing point with possibly a little higher temperature. The transmitted energy is built up out-of-proportion and, in passing through the windshield to be absorbed by the ice or snow, is thereby increasingly effective to remove this objectionable adhering material from the region of the windshield. The location of the defroster unit as to the projector, desirably in practice is such as, under the circumstances herein recited and even at zero temperature, to provide for the clearing, under most adverse weather conditions, of a region approximating 100 squares inches, which is a range for safe driving observation.

In holding the temperature of the radiator 28 in the range of 1720° F. for radiator generation, there is efficient use of the energy not only as to the absorption by the glass and transmission therethrough, but in the consumption of the electric current. The heat radiated is proportional to the fourth power of the absolute temperature of the source. Accordingly, increasing the temperature from the range under 900° F. to the region of 1720° F., there is an increase of the ray generation into the region for use.

It is to be noted, in the disclosure herein, that the mass on the windshield has a tendency to hold its temperature during transition from a liquid to a solid state, and that the windshield itself as well as the surrounding outside atmosphere may have a considerably lower temperature. It thus follows that considerable importance inheres in the ray generation for increased transmission into the moisture there to be absorbed. The energy for temperature rise in the glass need not be great or as great as required for the moisture, accordingly bringing the temperature of the glass up to a temperature to hold against refreezing suffices, with the rise in temperature from the absorption of energy of the rays sufficient to melt the film adjacent the glass.

This application is a continuation in part of Ser. No. 567,872, Patent No. 1,917,141 filed October 9, 1931, Defrosting.

What is claimed and it is desired to secure by Letters Patent is:

A ray generator unit for moisture removal from a transparency, said unit comprising a projector, a link, a bracket having a mounting pad, a pin through the bracket extending in a slanting direction relatively to the plane of the transparency, said pin being effective for mounting the link with the bracket, and a ball and socket frictional joint connection between the link and the projector.

LESLIE H. MIDDLETON.